3,154,552
METHYLATION OF PIPERAZINES
Eugene A. Weipert, Taylor, and William W. Levis, Jr., Wyandotte, Mich., assignors to Wyandotte Chemicals Corporation, Wyandotte, Mich., a corporation of Michigan
No Drawing. Filed June 21, 1961, Ser. No. 118,528
6 Claims. (Cl. 260—268)

This invention relates to a process for the preparation of N,N'-dimethylpiperazines. More particularly, this invention relates to a process for preparing N,N-dimethylpiperazines in high conversions.

The use of formaldehyde to methylate amines and ammonia is not new in the art. Eschweiler (Ber., 28c, 581 (1895); Ber., 38, 880 (1905)) first described the methylation of ammonia and amines with formaldehyde. In this process the methylation reaction is carried out in a pressure vessel at a temperature of about 130 to 160° C. and at a pressure of about 1,000 p.s.i.g. The difficulties and potential hazards of these reaction conditions are apparent since one of the products of the reaction is carbon dioxide gas. The application of Eschweiler's process to the preparation of N,N'-dimethylpiperazines has resulted in low conversions and a product containing a considerable amount of entrapped carbon dioxide gas, which makes it difficult to separate and recover the desired product. Therefore, it is readily apparent that the Eschweiler process has several disadvantages.

Subsequently, Clarke et al. (J. Am. Chem. Soc., 55, 4571 (1933)) modified the Eschweiler process by carrying out the reaction at atmospheric pressure in the presence of formaldehyde and an excess of formic acid. While the Clarke et al. process improved conversion some, the high cost of the formic acid is undesirable.

Kirby (U.S. 2,366,534) extended the Clarke et al. process to long chain tertiary amines. Subsequently, Erickson (U.S. 2,776,314) modified the Kirby process for methylating long chain amines by substituting sulfuric acid for part of the formic acid and obtained higher yields and a reduction in cost. The Erickson process requires the presence of sufficient sulfuric acid to fully neutralize the amine and preferably an excess of sulfuric acid to obtain high conversions to the methylated amine. However, it has been found that when this process is extended to piperazines high conversions are not obtained.

It is apparent from the foregoing that each of the processes described has certain disadvantages which render it undesirable for the production of N,N'-dimethylpiperazines.

Therefore, an object of this invention is to provide a new and improved process for producing N,N'-dimethylpiperazines.

Another object of this invention is to provide a process for producing N,N'-dimethylpiperazines with high conversions.

The foregoing objects and other objects are accomplished by mixing a piperazine compound corresponding to the formula:

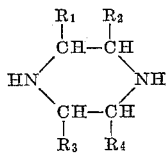

wherein $R_1$, $R_2$, $R_3$ and $R_4$ may be hydrogen, methyl, or ethyl radicals which may be the same or different, with about 2 to 2.4 mols of formaldehyde and about 2 to 2.4 mols of formic acid per mol of said piperazine compound in the presence of about 0.5 mol of sulfuric acid per mol of said piperazine compound. The reaction proceeds smoothly at a temperature of about 40 to 60 C. and at about atmospheric pressure.

It was surprising and unexpected indeed when, contrary to the teachings of the prior art, it was discovered that the neutralization with sulfuric acid of only one amino group of the piperazine compound resulted in a material improvement in conversion to the corresponding dimethylpiperazine. This is completely contrary to the aforesaid Erickson patent which teaches the employment of at least enough sulfuric acid to fully neutralize the amino groups and preferably an excess of sulfuric acid. When the Erickson process was extended to piperazines a conversion of only 79% was obtained. While the conversion was higher than that obtained by the Clarke et al. process (68%) it was substantially less than that obtained by the process of this invention (89%). The process of this invention also differs from the Erickson process as to the reaction temperature. Erickson's process requires temperatures greater than 90° C. to obtain a comparable reaction rate to that of the process of this invention carried out at about 40 to 60° C. Thus, the process of this invention is novel and unobvious in view of the teachings of the prior art.

The N,N'-dimethylpiperazines prepared by the process of this invention include both N,N'-dimethylpiperazine and N,N'-dimethylpiperazines having alkyl-substituted carbon atoms. Thus, the compounds are tertiary amines which are useful as urethane foam catalysts and epoxy curing agents and may be represented by the following formula:

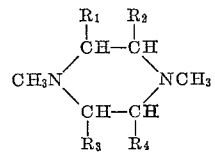

wherein $R_1$, $R_2$, $R_3$ and $R_4$ may be hydrogen, methyl, or ethyl radicals which may be the same or different.

Representative of the piperazine compounds which may be employed in the reaction are piperazine, 2-methylpiperazine, 2,5-dimethylpiperazine, 2,6-dimethylpiperazine, 2,3-dimethylpiperazine, 2,3,5-trimethylpiperazine, 2,3,5,6-tetramethylpiperazine, 2-ethylpiperazine, 2,5-diethylpiperazine, 2,6-diethylpiperazine, 2,3,5,6-tetraethylpiperazine, 2-ethyl-5-methylpiperazine, 2,5-diethyl-3-methylpiperazine, 2-ethyl-3,5-dimethylpiperazine, 2,6-diethyl-3,5-dimethylpiperazine, 2-ethyl-3,5,6-trimethylpiperazine, and the like.

The formaldehyde and formic acid are present in their theoretical amounts and preferably in slight excesses of about 10 to 20%. Therefore the formaldehyde and formic acid are both present in the proportion of about 2 to about 2.4 mols per mol of piperazine compound.

The formaldehyde employed may be either in the form of an aqueous solution of formaldehyde or as paraformaldehyde. Both forms are readily available commercially. Commercially available formic acid containing 85 to 90% formic acid is also satisfactory for use in this reaction.

The quantity of sulfuric acid employed in the reaction is the most critical feature of this invention. It has been discovered that maximum conversion is obtained when only one amino group of the piperazine compound reactant is neutralized. Thus the sulfuric acid concentration is about 0.5 mol of sulfuric acid per mol of piperazine compound. However, it should be apparent that very slight variations in the concentration will not greatly adversely affect the conversion, but acid concentrations substantially higher or lower will result in a marked reduction in conversion. Experimentation has shown that sulfuric acid concentrations of 0.6 mol and 0.3 mol of sulfuric acid per mol of piperazine resulted in substantially lower conversions. Therefore, it must be again emphasized that the sulfuric acid concentration is critical.

In carrying out the methylation reaction the order of mixing the reactants may vary. Preferably the piperazine compound is added slowly to the formaldehyde while stirring and cooling to maintain the temperature of the reaction mixture below about 50° C. The sulfuric acid is then added and followed by addition of formic acid slowly at a rate such that the evolution of carbon dioxide gas is only moderate. After the addition of all the reactants is complete, the reaction is carried out at a temperature in the range of about 40 to 60° C. and preferably at about 45 to 55° C. While temperature has been found to increase the rate of reaction, it is desirable to carry out the reaction at a temperature not greater than 60° C. Higher temperatures produce a violent evolution of carbon dioxide gas and are not recommended. Temperatures below 40° C. are not suitable because of the slow rate of reaction at these temperatures. Completion of the reaction coincides with the ceasing of the carbon dioxide gas evolution from the reaction mixture and usually occurs within 6 hours when the reaction is carried out at a temperature within the preferred range.

The work up of the reaction mixture to the final product may be carried out by several different methods. However, preferably the excess acid in the reaction mixture is neutralized with 50% sodium hydroxide and at the same time water is added to prevent crystallization of sodium sulfate from the mixture. The methylated piperazine layer which separates is washed with 50% sodium hydroxide, diluted with water and then azeotropically distilled. The water-methylated piperazine azeotrope is collected and may be dried over 50% sodium hydroxide and fractionated if the anhydrous N,N'-dimethylpiperazine is desired. Conversions of up to 89% have been obtained from the process of this invention.

The following examples are set forth to illustrate the process of the invention and should not be used to unduly restrict the scope of the invention as it has been described herein. The percent conversion to the N-methylpiperazine product reported in the examples and previously mentioned was calculated as follows:

Percent conversion to N,N'-dimethylpiperazine (product)

$$= \frac{\text{mols of product obtained}}{\text{mols of piperazine charged}} \times 100$$

Example 1

A five-liter, three-necked flask equipped with stirrer, reflux condenser, thermometer and addition funnel was charged with 1070 grams (13.2 mols) of 37% formaldehyde solution. From the funnel 753 grams (6.0 mols) of 79.6% 2-methylpiperazine were added while the temperature was held below 40° C. After the piperazine addition was completed, 300 grams (3.0 mols) of concentrated sulfuric acid and then 675 grams (13.2 mols) of 90% formic acid were added. The reaction mixture was stirred for about 6 hours with the temperature held within the range of 40–51° C. at which time the carbon dioxide gas evolution subsided. To recover the 1,2,4-trimethylpiperazine product the mixture was diluted with water and neutralized with 50% sodium hydroxide. The piperazine layer which separated was washed with 50% sodium hydroxide, diluted, and distilled. The 96–99° C. water-methylated piperazine azeotrope fraction was collected. 1905 grams of the water-piperazine azeotrope were obtained which had an analysis of 35.8% 1,2,4-trimethylpiperazine and the conversion was calculated to be 88.8%.

Example 2

This example illustrates the adverse effect of a sulfuric acid concentration greater than 0.5 mol of sulfuric acid per mol of piperazine.

1,2,4-trimethylpiperazine was prepared according to the procedure of Example 1. The quantities of reactants were as follows:

| | Mols |
|---|---|
| Formaldehyde | 13.2 |
| 2-methylpiperazine | 6.0 |
| Sulfuric acid | 3.6 |
| Formic acid | 13.2 |

1641 grams of the 96–99° C. water-1,2,4-trimethylpiperazine azeotrope were obtained after distillation which had an analysis of 35.3% 1,2,4-trimethylpiperazine, which corresponds to a 76% conversion.

Example 3

This example illustrates the adverse effect on conversion when the piperazine starting material is fully neutralized with sulfuric acid.

1,2,4-trimethylpiperazine was prepared according to the procedure of Example 1. The quantities of reactants were as follows:

| | Mols |
|---|---|
| Formaldehyde | 13.2 |
| 2-methylpiperazine | 6.0 |
| Sulfuric acid | 6.0 |
| Formic acid | 13.2 |

1764 grams of the 96–99° C. water-1,2,4-trimethylpiperazine azeotrope were obtained after distillation which had an analysis of 34.4% 1,2,4-trimethylpiperazine, which corresponds to a 79.3% conversion.

Example 4

This example illustrates the adverse effect of a sulfuric acid concentration less than 0.5 mol of sulfuric acid per mol of piperazine.

Again 1,2,4-trimethylpiperazine was prepared according to the procedure of Example 1 and the quantities of the reactants were as follows:

| | Mols |
|---|---|
| Formaldehyde | 13.2 |
| 2-methylpiperazine | 6.0 |
| Sulfuric acid | 2.0 |
| Formic acid | 13.2 |

1617 grams of the 96–99° C. water-1,2,4-trimethylpiperazine azeotrope were obtained after distillation which had an analysis of 34.7% 1,2,4-trimethylpiperazine, which corresponds to a 73.1% conversion.

The foregoing examples particularly illustrate the process of this invention and the criticalness of the sulfuric acid concentration. It will also be apparent from the foregoing description that the objects of this invention have been attained. A new and improved process for preparing N-methylated piperazines has been invented that permits high conversions of piperazine to the corresponding N-methylated piperazine at low reaction temperatures.

We claim:

1. A process for preparing N,N'-dimethylpiperazines which comprises contacting a piperazine compound corresponding to the formula:

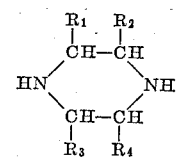

wherein $R_1$, $R_2$, $R_3$ and $R_4$ are members selected from the group consisting of hydrogen, methyl and ethyl radicals with about 2 to 2.4 mols of formaldehyde and about 2 to 2.4 mols of formic acid per mol of said piperazine compound in the presence of about 0.5 mol of sulfuric acid per mol of said piperazine compound at about 40 to 60° C. and at about atmospheric pressure.

2. A process according to claim 1 wherein said piperazine compound is piperazine.

3. A process according to claim 1 wherein said piperazine compound is 2-methylpiperazine.

4. A process according to claim 1 wherein said piperazine compound is 2,5-dimethylpiperazine.

5. A process according to claim 1 wherein said piperazine compound is 2,6-dimethylpiperazine.

6. A process for preparing N,N'-dimethylpiperazine which comprises contacting a piperazine compound corresponding to the formula:

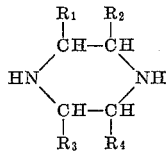

wherein $R_1$, $R_2$, $R_3$ and $R_4$ are members selected from the group consisting of hydrogen, methyl and ethyl radicals with about 2 to 2.4 mols of formaldehyde and about 2 to 2.4 mols of formic acid per mol of said piperazine compound in the presence of about 0.5 mol of sulfuric acid per mol of said piperazine compound at about 45 to 55° C. and at about atmospheric pressure.

References Cited in the file of this patent

UNITED STATES PATENTS

| | | |
|---|---|---|
| 2,366,534 | Kirby | Jan. 2, 1945 |
| 2,636,032 | Weston et al. | Apr. 21, 1953 |
| 2,776,314 | Erickson | Jan. 1, 1957 |
| 2,778,826 | Schmidle | Jan. 22, 1957 |

OTHER REFERENCES

Mann et al.: Journal Chemical Society (London), pages 4476–4480 (1954).

McElrain et al.: Journal American Chemical Society, vol. 76, pages 1126–1137 (1954).

Clarke et al.: Journal American Chemical Society, vol. 55, pages 4571–4587 (1933).